United States Patent [19]

Gorton

[11] Patent Number: 4,758,763

[45] Date of Patent: Jul. 19, 1988

[54] MEANS FOR ALIGNING A CATHODE-RAY TUBE AND RASTER WITH ITS ENCLOSURE

[75] Inventor: Philip S. Gorton, Beaverton, Oreg.

[73] Assignee: Tektronix, Inc., Beaverton, Oreg.

[21] Appl. No.: 859,562

[22] Filed: May 5, 1986

[51] Int. Cl.[4] .............................................. H01J 29/86
[52] U.S. Cl. ..................................... 313/482; 358/249
[58] Field of Search ................ 313/482; 358/248, 249, 358/254

[56] References Cited

U.S. PATENT DOCUMENTS

| | | | |
|---|---|---|---|
| 2,551,790 | 5/1951 | Davis et al. | 358/248 |
| 2,819,458 | 1/1958 | Bang | 358/248 |
| 4,360,838 | 11/1982 | Babicz et al. | 358/248 |
| 4,390,809 | 6/1983 | Mitchell et al. | 313/482 |

Primary Examiner—David K. Moore
Assistant Examiner—K. Wieder
Attorney, Agent, or Firm—John Smith-Hill; Robert S. Hulse

[57] ABSTRACT

A cathode-ray tube has at least two mounting members that are angularly spaced about the axis of the CRT, and a support structure for receiving the CRT has mounting members for engagement with the mounting members of the CRT, whereby the CRT and the support structure have at least first and second pairs of mutually interengageable mounting members. The first pair of mounting members comprises a first cylindrical post and a circular hole for receiving the first post and the second pair of mounting members comprises a second cylindrical post and a slot having a width substantially equal to the diameter of the second post.

4 Claims, 1 Drawing Sheet

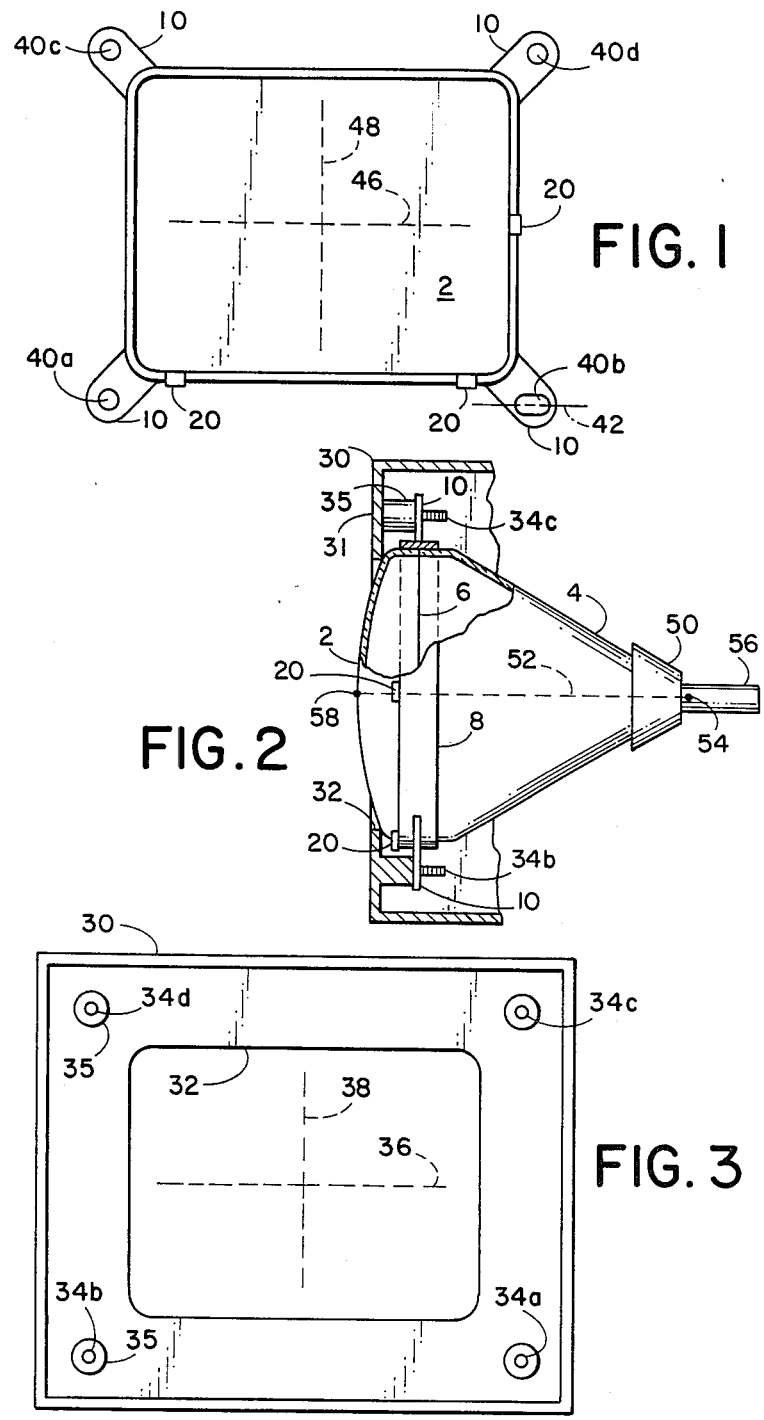

MEANS FOR ALIGNING A CATHODE-RAY TUBE AND RASTER WITH ITS ENCLOSURE

This invention relates to cathode-ray tube display devices.

BACKGROUND OF THE INVENTION

A cathode-ray tube (CRT) display device comprises a CRT, a support structure, such as a CRT enclosure or chassis, for the CRT, and a deflection yoke. The CRT has a faceplate that is usually of generally rectangular form and has an outer surface that is presented towards the viewer of the CRT and an inner surface that is presented towards an electron gun structure mounted in the neck of the CRT. The faceplate has a layer of phosphor material over its inner surface. In the case of a conventional shadowmask color CRT, the layer of phosphor material comprises three phosphors, which emit the three primary colors respectively. The three phosphors are deposited over the inner surface of the faceplate in groups or triads each comprising one dot or stripe of each phosphor color. The triads are uniformly distributed over the inner surface of the faceplate, being arranged in parallel rows that are on equally-spaced centerlines. When the deflection yoke is appropriately driven, the rows of triads are scanned successively by the electron beams generated by the electron gun structure. The array of parallel lines traced out on the faceplate by the electron beams is commonly referred to as the raster of the CRT. The orientation of the raster about the central axis of the CRT is determined by the positioning of the deflection yoke on the neck of the CRT.

The rows of phosphor triads are deposited on the inner surface of the faceplate by screen printing, and the orientation of the printing screen is set by reference to three alignment projections at the exterior of the faceplate. The alignment projections are also used to establish the orientation of the shadowmask relative to the faceplate. It is conventional for the shadowmask of an in-line CRT to include four apertures that result in two pairs of triads outside the central display area of the faceplate being energized. The two pairs of triads define two mutually perpendicular lines which bisect each other.

In the manufacture of a CRT, it is conventional to form a faceplate sub-assembly and a funnel sub-assembly and secure them together, using the alignment projections to establish orientation, and then fit a tension band around the faceplate/funnel assembly at a location close to the joint between the faceplate sub-assembly and the funnel sub-assembly. After the CRT has been assembled, the yoke is positioned on the neck of the CRT and is electrically driven to deflect the point of incidence of the electron beams over the inner surface of the faceplate in a raster pattern. The electron gun structure is energized so that a cross-like image is formed on the faceplate of the CRT. The cross is formed by the central line of the raster and the central portion of each other line of the raster. The orientation of the yoke about the neck of the CRT is adjusted to bring the cross-like image into registration with the above-mentioned mutually perpendicular lines, and the yoke is then fixed in position.

The tension band carries mounting lugs that project from the tension band at the four corners of the faceplate, and these lugs are formed with holes that fit over threaded mounting studs of the support structure in which the CRT is mounted. Washers and nuts are then fitted over the studs. The holes are oversized with respect to the studs, permitting adjustment of the position of the CRT relative to the support structure. When the CRT is in the desired position, the nuts on the studs are tightened, and the washers engage the mounting lugs and clamp the CRT in position.

The support structure generally includes elements that define the orientation in which the support structure will be used. For example, in the case of an enclosure, the structure has a front wall that is formed with a generally rectangular opening, and when the CRT is mounted in the enclosure a central display area of the faceplate can be viewed through that opening. The opening has two mutually perpendicular axes of symmetry that are respectively vertical and horizontal when the enclosure is positioned on a horizontal support surface. It is normally desired that the cross-like image be in registration with the axes of symmetry of the opening. The lines of the raster will then be horizontal when the CRT is positioned in the support structure and the support structure is oriented for use.

Automatic equipment that is used for adjusting the position of the CRT relative to its support structure in order to bring the raster lines to a horizontal orientation prior to tightening the nuts on the studs is very complex and expensive.

SUMMARY OF THE INVENTION

In a preferred combination of a cathode-ray tube and a support structure for receiving the CRT, the CRT has at least two mounting members that are angularly spaced about the axis of the CRT and the support structure has mounting members for engagement with the mounting members of the CRT, whereby the CRT and the support structure have at least first and second pairs of mutually interengageable mounting members. The first pair of mounting members comprises a first cylindrical post and a circular hole for receiving the first post and the second pair of mounting members comprises a second cylindrical post and a slot having a width substantially equal to the diameter of the second post.

BRIEF DESCRIPTION OF THE DRAWINGS

For a better understanding of the invention, and to show how the same may be carried into affect, reference will now be made, by way of example, to the accompanying drawings in which:

FIG. 1 is a front elevation of a CRT,

FIG. 2 is a side view, partly in elevation and partly in section, of the FIG. 1 CRT when mounted in an enclosure, the enclosure being shown only partially and in section, and FIG. 3 is a rear elevation of the CRT enclosure.

DETAILED DESCRIPTION

The CRT shown in FIGS. 1 and 2 has a faceplate 2 and a funnel 4. The faceplate and funnel are fabricated as separate sub-assemblies, and are joined together along a line 6. A tension band 8 is fitted around the CRT and covers the line 6 along which the separate sub-assemblies are joined. The CRT has a central axis 52 which is defined by a line from a point 54 on the axis of the neck 56 of the CRT to the point 58 on the faceplate that is closest to the point 54.

The faceplate is generally rectangular, and the tension band has four mounting lugs 10 projecting outwardly, away from the central axis of the CRT, at the four corners respectively of the faceplate.

Phosphor material is applied to the inner surface of the faceplate by screen printing, and the orientation of the printing screen relative to the central axis of the CRT is established by means of alignment projections 20. The alignment projections establish the location of the shadowmask (not shown) and of the yoke 50, the position of which defines the orientation of both the horizontal centerline 46 and the vertical centerline 48 of the raster. These same alignment projections are used to establish the orientation of the faceplate sub-assembly relative to the funnel sub-assembly prior to joining the two sub-assemblies together.

The enclosure 30 in which the CRT is to be mounted has a front panel 31 that defines an opening 32, through which the display provided by the CRT can be viewed. Screws 34 project from the front panel of the enclosure rearwardly, toward the interior of the enclosure. The four studs are outward of the four corners respectively of the opening 32. The enclosure may be made from synthetic plastic material by injection molding, in which case the screws 34 may be driven into pedestals 35 that are formed integrally with the enclosure. The centers of the two lower studs 34a and 34b are on a line that is parallel to the horizontal centerline 36 of the opening 32, and are equidistant from the vertical centerline 38. The centers of the two upper studs 34c and 34d are equidistant from the vertical centerline 38 and are on a line parallel to the horizontal centerline 36. Therefore, the centers of the studs are at the corners of a rectangle whose sides are parallel to the lines 36 and 38.

Holes 40 are formed in the mounting lugs 10 after the tension band 8 has been fitted to the faceplate/funnel assembly. The holes are formed by placing the CRT in a die that positions the CRT by reference to the alignment projections 20. A press is used to form the holes. The hole 40a is a circular hole whose diameter is slightly larger than the diameter of the stud 34a. The hole 40b is in the form of an elongated slot, the nominal width of which is equal to the diameter of the hole 40a and the length of which is selected to accommodate minor variations in the relative positions of the studs 34a and 34b. The longitudinal axis 42 of the slot 40b is parallel to the horizontal centerline 46 of the raster and the axis 42 and the center of the hole 40a are equidistant from the horizontal centerline 46. The holes 40c and 40d are considerably larger than the diameters of the studs, and the centers of these holes are equidistant from the vertical centerline 48 of the raster. The line joining the centers of the holes 40c and 40d is parallel to the horizontal centerline 46 of the raster.

When the CRT is installed in the enclosure 30, the studs 34a, 34b, 34c and 34d are inserted in the holes 40a, 40b, 40c and 40d respectively, and the engagement of the studs 34a and 34b with the holes 40a and 40b defines a unique position for the CRT relative to the enclosure. Because the holes 40 are positioned by reference to the alignment projections 20, the vertical and horizontal centerlines of the raster coincide (within manufacturing tolerances) with the vertical and horizontal centerlines of the opening 32. Washers (not shown) are fitted over the studs 34 and nuts (not shown) are threaded onto the studs. By tightening the nuts onto the studs, the mounting lugs 10 are clamped between the washers and the pedestals 35.

It will be appreciated that the present invention is not restricted to the particular embodiment that has been described and illustrated, and that variations may be made therein without departing from the scope of the invention as defined in the appended claims and equivalents thereof. For example, it is not essential that the holes 40a and 40b should both be at the same side of the CRT. The slot 40b could be diagonally opposite the hole 40a, provided that the slot is properly oriented. Also the invention is applicable to both color and monochrome CRTs. The holes 40 may be pre-formed in the lugs 10 and the lugs and the tension band mounted to the CRT using mechanical fixturing which references the positions of the lugs off the alignment projections 20.

I claim:

1. In combination, a cathode-ray tube (CRT) having a funnel and a faceplate, and a support structure for receiving the CRT, and including means for aligning the CRT and the support structure, one with respect to the other, the CRT having at least two mounting members that are angularly spaced about the axis of the CRT and the support structure having mounting members for engagement with the mounting members of the CRT, the CRT and the support structure having at least first and second pairs of mutually interengageable mounting members, said first pair of mounting members comprising a first cylindrical post and a member formed with a circular hole for receiving the post, the diameter of the circular hole being substantially equal to the diameter of the first cylindrical post, whereby said first pair of mounting members provides a first point of alignment between the CRT and the support structure, and said second pair of mounting members comprising a second cylindrical post and a member formed with an elongate slot having a width substantially equal to the diameter of the second cylindrical post, a line perpendicular to the longitudinal axis of the slot when the first and second pairs of mounting members are interengaged being transverse to a line joining the centers of the two cylindrical posts, whereby said second pair of mounting members provides a second point of alignment between the CRT and the support structure and the orientation of the elongate slot with respect to the line joining the centers of the two cylindrical posts provides a third point of alignment between the CRT and the support structure.

2. A combination according to claim 1, wherein the cylindrical posts are the mounting members of the support structure and the members formed respectively with the circular hole and the elongate slot are mounting members of the CRT.

3. A combination according to claim 1, wherein the faceplate is generally rectangular and the mounting members of the CRT are in the vicinity of respective corners of the faceplate.

4. A combination according to claim 3, wherein the mounting members of the CRT are in the vicinity of two adjacent corners of the faceplate, and the CRT and the support structure each have at least a third mounting member, the third mounting member of the CRT being in the vicinity of a third corner of the faceplate and being interengageable with the third mounting member of the support structure when the first and second pairs of mounting members are interengaged.

* * * * *